Feb. 27, 1951 E. H. LAND 2,543,180

PHOTOGRAPHIC APPARATUS

Filed Feb. 3, 1948

INVENTOR
Edwin H. Land
BY Donald L. Brown
Attorney

Patented Feb. 27, 1951

2,543,180

UNITED STATES PATENT OFFICE 2,543,180

PHOTOGRAPHIC APPARATUS

Edwin H. Land, Cambridge, Mass., assignor to Polaroid Corporation, Cambridge, Mass., a corporation of Delaware Application February 3, 1948, Serial No. 5,929

5 Claims. (Cl. 95—13)

This invention relates to photography, and more particularly to photographic apparatus for processing a photosensitive sheet material.

One object of the present invention is to provide a novel apparatus in which a photosensitive sheet material may be processed by means of a processing agent carried in a container by having the contents of said container spread in a layer over a predetermined area thereof, said container being inserted into said apparatus in a position to have its contents so released thereby.

Another object is to provide a novel apparatus of the above type wherein the photosensitive sheet material is photoexposed prior to the processing thereof.

Still another object is to provide a novel apparatus of the foregoing character in which the contents of the container are spread between the photosensitive sheet material and another sheet material and the apparatus is capable of carrying out a processing whereby a positive image of the subject matter to which the photosensitive sheet material has been exposed is obtained as a result of the spreading of the contents of the container.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

Figure 1:
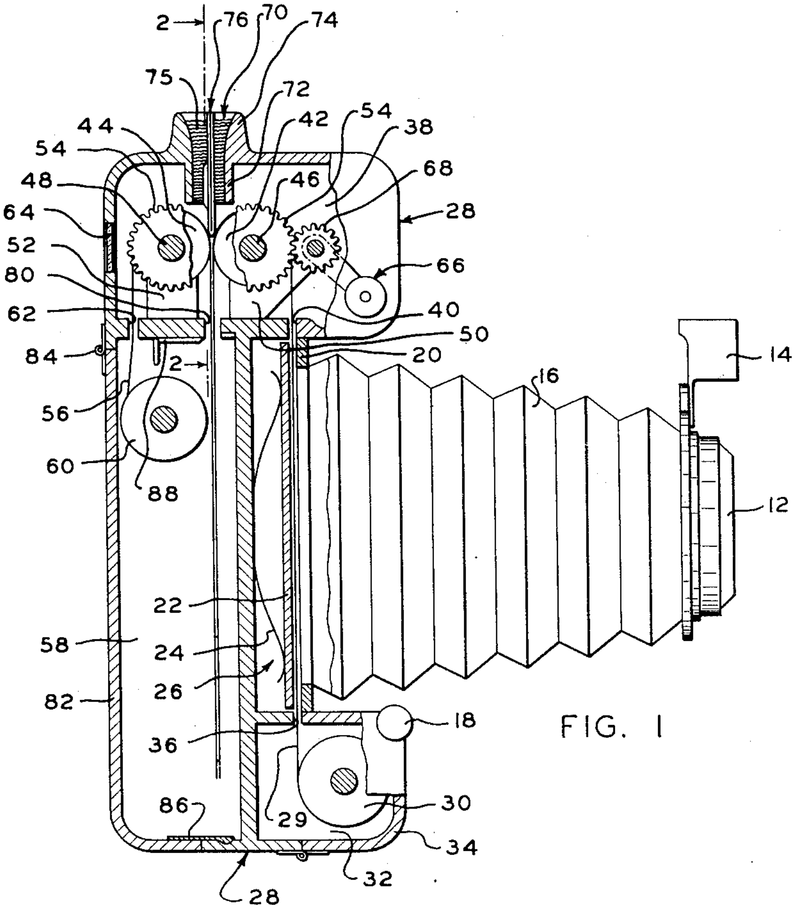
Figure 2:
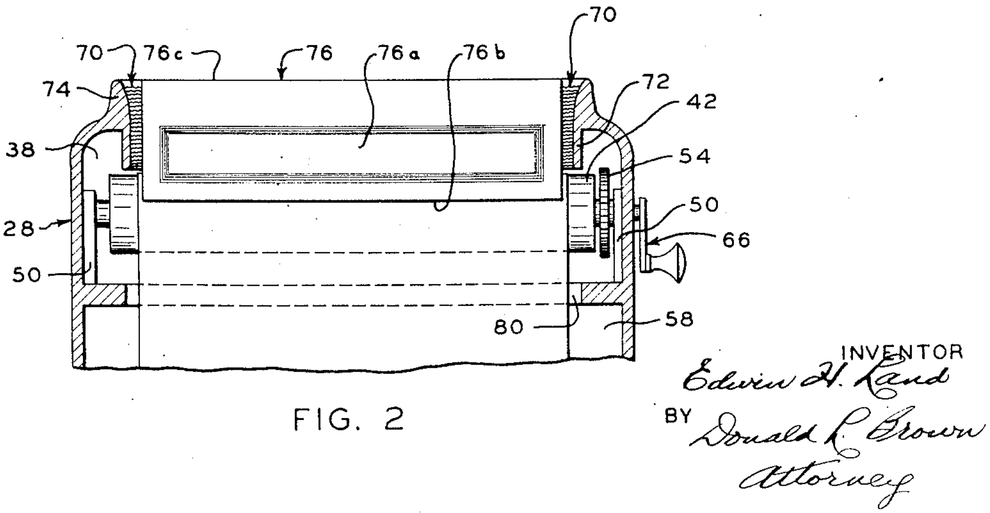

For a fuller understanding of the nature and objects of the invention, reference should be had to the following detailed description taken in connection with the accompanying drawings wherein:

Figure 1 is a view, partly in elevation and partly in section, with parts broken away, of one form of the novel apparatus of the present invention; and Fig. 2 is a fragmentary, sectional view taken substantially along line 2—2 of Fig. 1.

One form of the novel apparatus of the present invention is so constructed that a photosensitive sheet material may be photoexposed therein to predetermined subject matter and subsequent to the exposure thereof may be advanced into superposed relation with another sheet material. A collapsible container carrying a sufficient quantity of processing fluid to subject the exposed area of the photosensitive sheet material to a given processing may be inserted into the apparatus and located adjacent the exposed area of the photosensitive sheet material and between said sheet materials as the same are superposed. After the container is so located, the two sheet materials are pressed together by movement thereof between and relative to a pair of pressure-applying members, the container contents being thus released from the container and caused to spread over the area of the photosensitive sheet material to be processed.

In one kind of processing which may be carried out by the apparatus of the invention, the processing fluid in the container, the photosensitive sheet material and the other sheet material cooperate to provide as a result of the processing a positive image on said other sheet material of the subject matter to which said photosensitive sheet material has been exposed. This type of processing is disclosed in my copending application Serial No. 728,983, filed February 17, 1947, for Photographic Product and Composition.

As shown in Fig. 1, the novel apparatus of the present invention is embodied in a hand camera structure comprising conventional means for photoexposing a photosensitive silver halide emulsion or the like to form therein a latent image. As shown, said means include a lens and shutter 12, view finder 14, bellows 16, means for controlling the operation of the shutter, including a shutter-actuating element 18, and a framing member 20 defining an exposure opening. Suitable means are provided for yieldably urging a frame of film into engagement with said framing member, such, for example, as a pressure plate 22 which is resiliently pressed as by a leaf spring 24 in the direction of said framing member. Pressure plate 22 and spring 24 are contained in an exposure chamber 26 formed in the main housing 28 of the camera.

Means are provided for mounting a supply such, for example, as a roll 30 of a photosensitive sheet material 29, and said means are contained in a chamber 32 formed in housing 28 adjacent one edge of the framing member 20. Chamber 32 has a door or other closure 34 forming one wall thereof, said door being hingedly secured to the housing 28 and rendering accessible the interior of chamber 32 for the mounting therein of film spool 30. When door 34 is closed, chamber 32 is rendered substantially lighttight.

There is preferably provided in one wall of chamber 32 a passage 36 through which the photosensitive film 29 may be advanced from chamber 32 to exposure position. After exposure, the film may be advanced from exposure chamber 26 into another chamber 38 provided in housing 28 adjacent the edge of framing member 20 opposite the edge which adjoins chamber 32. Chamber 38 has a passage 40 in the wall thereof which is common to chamber 26 through which the film 29 may be advanced into said chamber 38 after exposure.

In order to subject the photosensitive film to a predetermined processing by spreading thereon a layer of processing liquid, there is preferably provided in chamber 38 a pair of pressure-applying members between which said photosensitive film 29 may be advanced after it has been introduced into said chamber. These pressure-applying members may be a pair of plates or bars, but in the form shown are a pair of pressure rollers 42 and 44. Said rollers may be provided with a pair of shafts 46 and 48, respectively, which are in turn journaled at their opposite ends in suitable bearings provided therefor in two pairs of brackets 50 and 52 secured to or integrally formed with the wall members of housing 28. Shafts 46 and 48 are interconnected by a pair of gears 54 of the same size so that said shafts rotate said rollers in opposite directions at the same angular speed. Another sheet material 56 may be suitably mounted in a chamber 58 formed in housing 28 to the rear of the exposure aperture, which chamber is preferably lighttight with respect to the other chambers of said housing. Sheet material 56 may be a photographic paper and is preferably wound on a spool 60 which is in turn mounted in suitable mounting means therefor in said chamber 58. A passage 62 is provided in the wall which separates chambers 38 and 58, said passage being so located relative to the pressure roller 44 that the sheet material 56 may be readily advanced into chamber 38 over said roller 44 for superpositioning with film 29, the latter being adapted to be advanced from exposure position over pressure roller 42. A suitable aperture is preferably provided in the wall of chamber 38 through which a portion of the sheet material 56 may be viewed and this aperture is equipped with a window 64 formed of a material which is opaque to light actinic to the photosensitive sheet material. As a result, indicia on the surface of sheet material 56 may be visible from the exterior of the camera.

The foregoing construction provides for the photoexposure of film 29 and the advancement, subsequent to exposure of said film, between pressure rollers 42 and 44 in superposed relation with respect to sheet material 56.

There is provided in the wall of housing 28 which is common to chambers 58 and 38 a second passage 80 through which the superposed sheet materials may be advanced into chamber 58 after they have been subjected to compression by rollers 42 and 44. To render the interior of chamber 58 accessible for removal of the superposed materials, a suitable door member 82 forms one wall of said chamber 58 and is pivotally mounted as by a hinge 84 so that it may swing open. A latch 86 may be provided to hold said door shut.

The two sheet materials 56 and 29 may be pulled between pressure rollers 42 and 44, thereby rotating the rollers as they advance with respect thereto, or the rollers may be rotated, causing the sheets to advance therebetween. In the form shown, said rollers may be rotated from the exterior of the camera by means of a crank 66 which is connected to pinion 68 mounted on the interior of the camera, said pinion meshing with one of gears 54.

Each of passages 36, 40, 62 and 80, through which the sheet materials advance, may be provided with suitable means such, for example, as a lining of felt or fur (not shown) for reducing the same lighttight.

In order to provide the processing fluid required to carry out the desired processing of photosensitive sheet material 29, suitable collapsible containers are preferably employed which, when subjected to compression between the film 29 and sheet material 56, are capable of releasing their contents for spreading between said layers. Containers of a type generally suitable for this purpose are disclosed in my aforementioned copending application Serial No. 728,983.

These containers are substantially rectangular in shape and have a long dimension somewhat longer than a linear transverse dimension of the area to be processed by the contents thereof, and are adapted to be positioned adjacent such an area with the long edge thereof parallel to said linear transverse dimension. Upon the application of a compressive force to the walls thereof, the contents of the container hydraulically unseal the latter along the edge thereof adjacent said area to form a passage equal in length to the width of said area. Continued application of pressure causes the release of the contents of the container and the spreading thereof over said area.

The apparatus of the present invention is so constructed that a container of this type may be inserted manually from the exterior of the camera into the camera in a position such that said container may be thereafter advanced between the two sheet materials 29 and 56 as the latter are moved relative to pressure rollers 42 and 44. To this end, a container passage 70 is provided and has the long dimension thereof slightly in excess of the length of the containers to be inserted therein. The passage is preferably formed in the upper wall of housing 28, said housing being provided with a depending flange 72 which extends within the chamber 38 and upwardly extending flange 74 which is exterior of the housing 28. These flanges provide the walls for passage 70, the lower end of said passage being located just above the space between the two rollers 42 and 44 so that a container fed through passage 70 has the leading edge thereof automatically positioned between said rollers. Passage 70 preferably has the walls thereof lined with felt, fur, or other material which renders the same normally lighttight and which also acts to engage the walls of any container inserted into said passage and to maintain the same lighttight during said insertion.

A container 76 so positioned is shown in Figs. 1 and 2, said container having a liquid-containing portion 76*a* and relatively flat leading and trailing edges 76*b* and 76*c*, respectively. The flat leading edge facilitates the advancement of the container between the pressure rollers and the flat trailing edge has a dimension in the direction of the width of the container, i. e., the dimension parallel to the direction of movement of the container during insertion, which is equal or greater than the dimension of the liquid-containing portion measured in the same direction. This construction is preferred in order to prevent any light leaks during the insertion of the container into and through passage 70.

In operation, the novel apparatus of the present invention preferably has a spool of photosensitive film 29 mounted in chamber 32 thereof. The film is then threaded through passage 36 between plate 22 and frame 20 and through passage 40 and over pressure roller 42 and then between said rollers and through passage 80 into chamber 58. A spool 60 of sheet material 56 is also mounted in chamber 58 and is advanced through passage 62 over roll 44 and between said rollers, and is superposed with a corresponding portion of the photosensitive film. A frame of film 29 may then be exposed and prior or subsequent to the exposure thereof a container may be inserted into passage 70 so that it is in a position to be advanced with said sheet materials between pressure rollers 42 and 44. Subsequent to exposure, the sheet materials 29 and 56 are so advanced, the container being compressed by the pressure rollers as it moves relative thereto and its contents are released and spread over the exposed area of film 29, thereby providing a layer of processing liquid adjacent said area. The two superposed sheet materials are advanced through passage 70 into chamber 58 wherein they may be retained until the processing is complete. Thereafter, door 82 is opened to render the interior of the chamber accessible for removal of that portion of the superposed sheet materials 29 and 56 contained therein. To facilitate the removal, a suitable severing means 88 may be mounted adjacent passage 80 for acting on the superposed materials extending through said passage to sever the same along a line substantially parallel to the upper wall of chamber 58.

Although the apparatus of the present invention is illustrated hereinabove as embodied in a hand camera, it is to be expressly understood that the invention is not limited thereto, but may be incorporated, for example, in a photocopying machine for making duplicates of documents or in other types of photographic apparatus wherein a sheet material is adapted to be exposed and subjected to a predetermined processing.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Apparatus for processing a photosensitive sheet material in conjunction with another sheet material and at least one elongated container which releasably holds a liquid capable of carrying out said processing and which is manually inserted into said apparatus, said container being relatively flat and having a leading edge generally parallel to its long dimension and a trailing edge opposite said leading edge which comprises a dispensing lip through which the contents of the container may be dispensed, said apparatus comprising, in combination, a substantially lighttight housing, means in said housing for supplying a strip of said photosensitive sheet material, means in said housing defining an exposure opening for exposing a predetermined area of said photosensitive sheet material, means in said housing for supplying a strip of said other sheet material, means in said housing comprising a pair of pressure-applying members between which predetermined areas of said photosensitive sheet material are capable of being advanced in superposed relation with said other sheet material, and means providing a passage from the exterior of said housing to the interior of said housing, said passage including light-seal means which prevent light from passing therethrough while permitting one of said containers to be passed therethrough, said passage being so located in said apparatus, with respect to the path of travel of said sheet materials, as to guide said container, inserted therethrough, into engagement with at least one of said sheet materials in such a way that said container is advanced with said sheet materials between said pressure-applying members with its leading edge foremost, said passage being elongated with its long dimension at least equal in length to the length of said container and having wall portions which constitute guides for said container, said wall portions projecting within said apparatus a sufficient distance to space the inner end of said passage from said pressure-applying members by a distance less than the width of one said container, said members acting in cooperation with said sheet materials as said container is advanced therebetween to release the contents of said container through its dispensing lip and to spread said contents throughout a predetermined portion of said photosensitive material to process the same.

2. Apparatus for processing a photosensitive sheet material in conjunction with another sheet material and at least one elongated container which releasably holds a liquid capable of carrying out said processing and which is manually inserted into said apparatus, said container being relatively flat and having a leading edge generally parallel to its long dimension and a trailing edge opposite said leading edge which comprises a dispensing lip through which the contents of the container may be dispensed, said apparatus comprising, in combination, a substantially lighttight housing, means in said housing for supplying a strip of said photosensitive sheet material, means in said housing defining an exposure opening for exposing a predetermined area of said photosensitive sheet material, means in said housing for supplying a strip of said other sheet material, means in said housing comprising a pair of pressure-applying members between which predetermined areas of said photosensitive sheet material are capable of being advanced in superposed relation with said other sheet material, and means providing a passage from the exterior of said housing to the interior of said housing, said passage including light-seal means which prevent light from passing therethrough while permitting one of said containers to be passed therethrough, said passage being so located in said apparatus, with respect to the path of travel of said sheet materials, as to guide said container, inserted therethrough, into engagement with at least one of said sheet materials in such a way that said container is advanced with said sheet materials between said pressure-applying members with its leading edge foremost, said passage being elongated with its long dimension at least equal in length to the length of said container and having wall portions which constitute guides for said container, said wall portions projecting within said apparatus a sufficient distance to space the inner end of said passage from said pressure-applying members by a distance less than the width of one said container and projecting exteriorly of said apparatus to provide a lip for facilitating the insertion of a container, said members acting in cooperation with said sheet materials as said container is advanced therebetween to release the contents of said container through its dispensing lip and to spread said contents throughout a predetermined portion of said photosensitive material to process the same.

3. Apparatus for processing a photosensitive sheet material in conjunction with another sheet material and at least one elongated container which releasably holds a liquid capable of carrying out said processing and which is manually inserted into said apparatus, said container being relatively flat and having a leading edge generally parallel to its long dimension and a trailing edge opposite said leading edge which comprises a dispensing lip through which the contents of the container may be dispensed, said apparatus comprising, in combination, a substantially lighttight housing, means in said housing for supplying a strip of said photosensitive sheet material, means in said housing defining an exposure opening for exposing a predetermined area of said photosensitive sheet material, means in said housing for supplying a strip of said other sheet material, means in said housing comprising a pair of pressure-applying rollers between which predetermined areas of said photosensitive sheet material are capable of being advanced in superposed relation with said other sheet material, and means providing a passage from the exterior of said housing to the interior of said housing, said passage including light-seal means which prevent light from passing therethrough while permitting one of said containers to be passed therethrough, said passage being so located in said apparatus, with respect to the path of travel of said sheet materials, as to guide said container, inserted therethrough, into engagement with at least one of said sheet materials in such a way that said container is advanced with said sheet materials between said pressure-applying rollers with its leading edge foremost, said passage being elongated with its long dimension at least equal in length to the length of said container and having wall portions which constitute guides for said container, said wall portions projecting within said apparatus a sufficient distance to space the inner end of said passage from said pressure-applying rollers by a distance less than the width of one said container, said rollers acting in cooperation with said sheet materials as said container is advanced therebetween to release the contents of said container through its dispensing lip and to spread said contents throughout a predetermined portion of said photosensitive material to process the same.

4. Apparatus for exposing a photosensitive sheet material and for processing said sheet material in conjunction with another sheet material by means of containers which releasably hold a liquid capable of carrying out said processing and which are manually inserted into said apparatus, each said container being relatively flat and elongated and having a leading edge parallel to its long dimension and a trailing edge opposite said leading edge which comprises a dispensing lip through which the contents of the container may be dispensed, said apparatus comprising, in combination, a substantially lighttight housing, means in said housing for supplying a strip of said photosensitive sheet material, means in said housing defining an exposure opening for exposing a predetermined area of said photosensitive sheet material, means in said housing for supplying a strip of said other sheet material, means in said housing comprising a pair of pressure-applying members between which the exposed area of said photosensitive sheet material is capable of being advanced in superposed relation with said other sheet material, and means providing a passage from the exterior of said housing to the interior of said housing, said passage including light-seal means, and said passage extending into said apparatus and being so located in said apparatus, with respect to the path of travel of said sheet materials, as to guide one said container, inserted therethrough, into engagement with at least one of said sheet materials in such a way that said container has its leading edge foremost and is advanced with said sheet materials between said pressure-applying members, said members acting in cooperation with said materials as said container is advanced therebetween to release the contents of said container through its dispensing lip and to spread said contents throughout said exposed area to process the same.

5. Apparatus for exposing a photosensitive sheet material and for processing said sheet material in conjunction with another sheet material by means of containers which releasably hold a liquid capable of carrying out said processing and which are manually inserted into said apparatus, each said container being relatively flat and elongated and having a leading edge parallel to its long dimension and a trailing edge opposite said leading edge which comprises a dispensing lip through which the contents of the container may be dispensed, said apparatus comprising, in combination, a substantially lighttight housing, means in said housing for supplying a strip of said photosensitive sheet material, means in said housing defining an exposure opening for exposing a predetermined area of said photosensitive sheet material, means in said housing for supplying a strip of said other sheet material, means in said housing comprising a pair of pressure-applying members between which the exposed area of said photosensitive sheet material is capable of being advanced in superposed relation with said other sheet material, and means providing a passage from the exterior of said housing to the interior of said housing, said passage including light-seal means, said passage extending into said apparatus and being so located in said apparatus, with respect to the path of travel of said sheet materials, as to guide one said container, inserted therethrough, into engagement with at least one of said sheet materials in such a way that said container has its leading edge foremost and is advanced with said sheet materials between said pressure-applying members, the inner end of said passage being spaced from said pressure-applying members by a distance less than the width of said container, said members acting in cooperation with said materials as said container is advanced therebetween to release the contents of said container through its dispensing lip and to spread said contents throughout said exposed area to process the same.

EDWIN H. LAND.

REFERENCES CITED

The following references are of record in the file of this patent:

UNITED STATES PATENTS

| Number | Name | Date |
|---|---|---|
| 1,590,796 | Banks | June 29, 1926 |